United States Patent
Csizmadia et al.

(10) Patent No.: US 12,473,949 B2
(45) Date of Patent: Nov. 18, 2025

(54) SPROCKET ASSEMBLY AND A METHOD FOR PREVENTING INGRESS OF DIRT IN A BEARING OF A SPROCKET ASSEMBLY

(71) Applicant: CeramicSpeed Sport A/S, Holstebro (DK)

(72) Inventors: Jacob Csizmadia, Holstebro (DK); Anders Pedersen, Herning (DK)

(73) Assignee: CeramicSpeed Sport A/S, Holstebro (DK)

( * ) Notice: Subject to any disclaimer, the term of this patent is extended or adjusted under 35 U.S.C. 154(b) by 74 days.

(21) Appl. No.: 18/437,592

(22) Filed: Feb. 9, 2024

(65) Prior Publication Data
US 2024/0271662 A1   Aug. 15, 2024

(30) Foreign Application Priority Data
Feb. 10, 2023  (DK) .......................... PA 2023 00122

(51) Int. Cl.
*F16C 33/76*  (2006.01)
*B60B 27/02*  (2006.01)
(Continued)

(52) U.S. Cl.
CPC ............. *F16C 33/76* (2013.01); *F16H 55/36* (2013.01); *B60B 27/023* (2013.01);
(Continued)

(58) Field of Classification Search
CPC .......... F16H 55/36; F16H 55/30; F16C 33/76; F16C 2326/28; F16C 2326/02;
(Continued)

(56) References Cited

U.S. PATENT DOCUMENTS 985,711 A * 2/1911 Sparks ................ F16H 57/0415
474/93
1,385,396 A * 7/1921 Rayburn ................ F16H 55/38
109/9
(Continued)

FOREIGN PATENT DOCUMENTS

CN   201305106   9/2009
CN   204140822 U  2/2015
(Continued)

OTHER PUBLICATIONS

Extended European Search Report for corresponding European patent application No. 24154083.0 dated Jun. 14, 2024, 10 pages.
(Continued)

*Primary Examiner* — Henry Y Liu
(74) *Attorney, Agent, or Firm* — Lee & Hayes, P.C.

(57) ABSTRACT

A sprocket assembly includes a sprocket including a center orifice and a bearing located in the center orifice with an outer part of the bearing fixed in relation to the sprocket. The sprocket assembly also includes a dust cover fixed in relation to an inner part of the bearing. An outer cover diameter of the dust cover is bigger than an outer bearing diameter of the bearing, so that an outer periphery of the dust cover extends radially past the outer part. The sprocket also includes an impeller arranged at the outer periphery of the dust cover. The impeller is fixed in relation to the sprocket.

15 Claims, 4 Drawing Sheets

Figure 3:
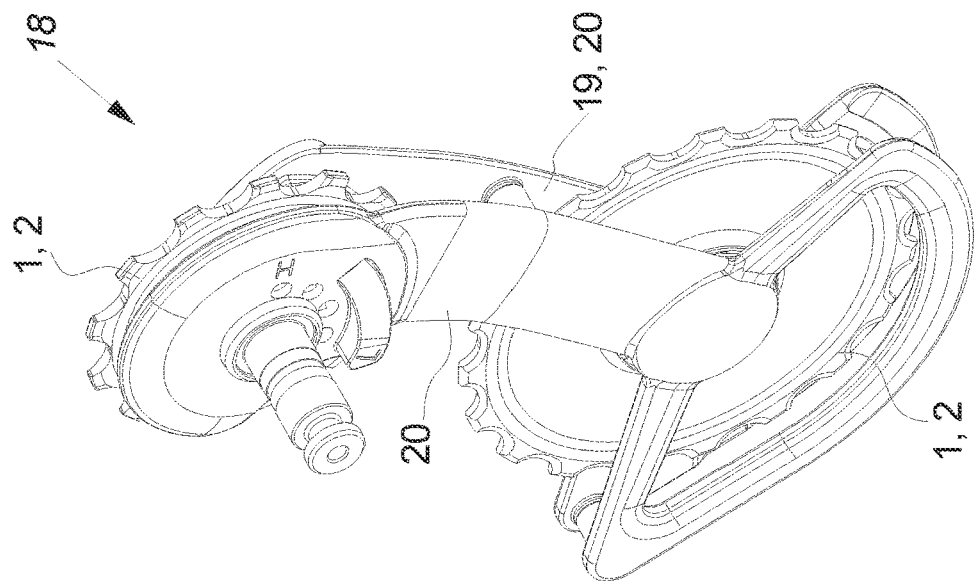

(51) Int. Cl.
*B62M 3/00* (2006.01)
*B62M 9/06* (2006.01)
*F16H 55/36* (2006.01)

(52) U.S. Cl.
CPC ..... *B60B 2380/90* (2013.01); *B60B 2900/211* (2013.01); *B62M 3/003* (2013.01); *B62M 9/06* (2013.01); *F16C 2326/28* (2013.01)

(58) Field of Classification Search
CPC ...... F16C 33/762; F16C 13/006; F16C 33/78; F16J 15/164; B60B 27/023; B60B 2380/90; B60B 2900/211; B62M 3/003; B62M 9/06; B62M 9/126; B62M 1/00; B62M 9/10; B62M 9/16; B65G 39/09
USPC .......................................................... 474/93
See application file for complete search history.

(56) References Cited

U.S. PATENT DOCUMENTS

| | | | | |
|---|---|---|---|---|
| 1,400,671 A * | 12/1921 | Fischer | ................... | F16H 55/38 |
| | | | | 474/93 |
| 2,057,435 A * | 10/1936 | Kimble | ................... | F16H 55/36 |
| | | | | 474/93 |
| 2,163,736 A * | 6/1939 | Parker | ................... | B66D 1/7442 |
| | | | | 242/909 |
| 2,212,774 A * | 8/1940 | Guyer | ................... | F01P 7/042 |
| | | | | 474/93 |
| 2,513,599 A * | 7/1950 | Renshaw | ................... | F16H 7/18 |
| | | | | 384/546 |
| 2,827,225 A * | 3/1958 | Killian | ................... | F16H 55/44 |
| | | | | 474/93 |
| 2,842,974 A * | 7/1958 | Neumann | ............... | F16H 55/44 |
| | | | | 474/93 |
| 2,850,852 A * | 9/1958 | Hofberger | ............... | F16H 55/36 |
| | | | | 474/93 |
| 2,955,748 A * | 10/1960 | Killian | ................. | B21D 53/261 |
| | | | | 474/93 |
| 3,119,140 A * | 1/1964 | Sallet | ....................... | F16H 7/02 |
| | | | | 34/115 |
| 3,494,213 A * | 2/1970 | Schoenfeld | ............. | B27B 17/08 |
| | | | | 474/93 |
| 3,659,471 A * | 5/1972 | Marsch | ................... | F16H 55/36 |
| | | | | 123/41.11 |
| 3,788,155 A * | 1/1974 | Cigala | ................... | F16H 55/48 |
| | | | | 474/190 |
| 3,826,306 A * | 7/1974 | Marsh | ................. | F16H 57/0412 |
| | | | | 165/47 |
| 4,204,720 A | 5/1980 | Otani | | |
| 4,629,444 A * | 12/1986 | Miranti, Jr. | ............. | F16H 57/05 |
| | | | | 474/93 |
| 4,925,367 A * | 5/1990 | Paliwoda | ................ | F04D 29/049 |
| | | | | 415/214.1 |
| 5,417,617 A * | 5/1995 | Milton | ................... | F16H 55/171 |
| | | | | 474/93 |
| 5,947,611 A * | 9/1999 | Nagase | ................. | F16C 41/007 |
| | | | | 384/448 |
| 7,562,755 B2 * | 7/2009 | Spahr | ................. | B60B 27/0073 |
| | | | | 192/64 |
| 8,061,901 B2 | 11/2011 | Hosmer | | |
| 8,398,512 B2 * | 3/2013 | Dickinger | ............... | F16H 55/38 |
| | | | | 474/93 |
| 8,967,371 B2 * | 3/2015 | Dunn | ...................... | F16C 33/60 |
| | | | | 198/780 |
| 9,410,472 B2 * | 8/2016 | Gacka | ........................ | F01P 5/12 |
| 10,865,882 B2 * | 12/2020 | Lutaud | ................. | F16J 15/3228 |
| 10,907,688 B2 * | 2/2021 | Kamiji | ............... | F16C 33/7883 |
| 11,473,627 B2 * | 10/2022 | Barbera | ................ | F16J 15/326 |
| 12,188,487 B2 * | 1/2025 | Deeg | ................... | H02K 9/06 |
| 2003/0144102 A1 * | 7/2003 | Lin | ........................ | F16C 33/76 |
| | | | | 474/199 |
| 2006/0270503 A1 * | 11/2006 | Suzuki | ............... | F16H 57/0415 |
| | | | | 474/93 |
| 2008/0006500 A1 * | 1/2008 | Spahr | .................. | B60B 27/0073 |
| | | | | 192/64 |
| 2008/0167149 A1 * | 7/2008 | Beauprez | .............. | F04D 29/043 |
| | | | | 384/549 |
| 2009/0298627 A1 * | 12/2009 | Johnson | ..................... | F16H 9/18 |
| | | | | 474/93 |
| 2011/0284346 A1 * | 11/2011 | Dunn | ..................... | F16C 33/60 |
| | | | | 464/182 |
| 2014/0235384 A1 * | 8/2014 | Yamaguchi | ......... | F16H 57/0489 |
| | | | | 474/93 |
| 2015/0345366 A1 * | 12/2015 | Gacka | ........................ | F01P 5/12 |
| | | | | 123/41.47 |
| 2015/0377341 A1 * | 12/2015 | Renner | ............... | F16H 57/0416 |
| | | | | 474/93 |
| 2016/0006325 A1 * | 1/2016 | Grabner | ................ | H02K 11/33 |
| | | | | 310/62 |
| 2019/0017602 A1 * | 1/2019 | Lutaud | ................. | F16J 15/3228 |
| 2020/0024534 A1 * | 1/2020 | Hong | ........................ | C10L 5/02 |
| 2020/0123901 A1 * | 4/2020 | Krivko | .................... | F02B 55/14 |
| 2022/0163052 A1 * | 5/2022 | Deeg | ...................... | F04D 19/002 |
| 2022/0324534 A1 | 10/2022 | Brown | | |

FOREIGN PATENT DOCUMENTS

| | | |
|---|---|---|
| CN | 204377453 U | 6/2015 |
| CN | 210461608 U | 5/2020 |
| DE | 102015214016 | 1/2017 |
| DE | 102017106196 | 9/2018 |
| DE | 102019217606 | 5/2020 |
| DE | 102021210760 | 4/2022 |
| JP | S4512494 Y1 | 6/1970 |
| JP | 2020165444 A | 10/2020 |
| KR | 100822550 | 4/2008 |
| KR | 100863647 | 10/2008 |
| WO | WO2010/143694 | 12/2010 |
| WO | WO2020110922 | 10/2021 |

OTHER PUBLICATIONS

Danish Search Report for corresponding Danish patent application PA 2023 00122 dated Jul. 20, 2023, 4 pages.

* cited by examiner dir
SPROCKET ASSEMBLY AND A METHOD FOR PREVENTING INGRESS OF DIRT IN A BEARING OF A SPROCKET ASSEMBLY This Application claims priority to DK Patent Application No. PA 2023 00122, filed Feb. 10, 2023, the contents of which is incorporated herein by reference.

FIELD OF THE INVENTION

The invention relates to sprocket assembly comprising a sprocket including a centre orifice and a bearing located in the centre orifice with an outer part of the bearing fixed in relation to the sprocket. Furthermore, the invention relates to a method for preventing ingress of dirt in a bearing of a sprocket assembly and use of a sprocket assembly.

BACKGROUND OF THE INVENTION

In relation to bicycling, and particularly in relation to off-road cycling activities such as cyclo-cross, mountain biking, gravel bicycling and the like, it is known that the bearings in e.g., the sprocket assemblies of a pulley wheel system in an external derailleur system are subject to much wear and tear due to ingress of dirt in the bearings. A solution could be to use fully sealed bearings but the friction in these bearings is relatively high which is undesirable in relation to bicycles.

From the Japanese patent application JP 2020-165444 A it is known to provide a pully with a cover connected to the pulley so that a gap is formed between the cover and the bearing at the inner diameter of the cover. The cover has an axially extending outer ring part provided with dust discharge holes which allows dust to exit the inside to the cover by centrifugal force. However, such dust discharge holes in the cover and the gap between the cover and the bearing also allows easy access of water and dirt to the bearing and is therefore not particularly efficient.

It is therefore an object of the present invention to provide an advantageous sprocket assembly and method for preventing ingress of dirt in the bearing of the sprocket assembly.

SUMMARY OF THE INVENTION

The invention relates to a sprocket assembly comprising a sprocket including a centre orifice and a bearing located in the centre orifice with an outer part of the bearing fixed in relation to the sprocket. The sprocket assembly also comprises a dust cover fixed in relation to an inner part of the bearing, wherein an outer cover diameter of the dust cover is bigger than an outer bearing diameter of the bearing, so that an outer periphery of the dust cover is extending radially past the outer part. Furthermore, the sprocket assembly comprises an impeller arranged at the outer periphery of the dust cover, wherein the impeller is fixed in relation to the sprocket.

Fixing the impeller in relation to the sprocket is advantageous in that it hereby is possible to fix the dust cover in relation to the inner part of the bearing and thereby form a closed dust cover with a tight seal against the inner part of the bearing. Furthermore, fixating the dust cover in relation to the inner part of the bearing and making it extend radially past the outer part of the bearing is advantageous, in that hereby the entire central and vulnerable part of the bearing is protected by the dust cover. And to protect against ingress of mud, dirt and other along the outer periphery of the dust cover it is advantageous to arrange the impeller here, in that the impeller will deflect any dirt or mud and to at least to some extent generate an air flow away from the sprocket and the outer periphery of the dust cover, thereby protecting the bearing by reducing the risk of ingress of dirt, mud and other along the outer periphery of the dust cover, while at the same time enabling that the sprocket assembly can be formed without contact between the outer periphery of the dust cover and the sprocket to ensure low internal friction of the sprocket assembly.

The terms "fixed", and "fixating" used throughout this document should be understood as the two parts referred to are fixed or locked against mutual motion. I.e., these terms mean that the two parts are connected by means of connectors such as screws, bolts, rivets, interlocking geometry, adhesive, welding, soldering, shrink fitting or other or by the two parts being formed integrally with each other through casting, moulding, machining, forging or other.

In an aspect of the invention, the bearing is a rolling bearing, wherein the outer part is an outer ring of the rolling bearing, and the inner part is an inner ring of the rolling bearing, and wherein rolling elements are located between the inner ring and the outer ring.

Providing the sprocket assembly with a rolling bearing—also called a rolling-element bearing—is advantageous in that hereby the friction is reduced while at the same time increasing life and stability of the bearing.

In this context the term "rolling bearing" refers to any kind of ball bearing, roller bearing, needle bearing or other where rolling elements are located between an inner ring and an outer ring the bearing.

In an aspect of the invention, the rolling bearing comprises a non-contact seal between the inner ring and the outer ring.

Providing the rolling bearing with a non-contact seal between the inner ring and the outer ring is advantageous in that the seal reduces the risk of ingress of dirt, mud or other into the rolling element part of the bearing while at the same time the non-contact quality ensures low internal friction of bearing.

In an aspect of the invention, the outer periphery of the dust cover is extending radially past the outer part and further axially into an axial groove in the sprocket, and wherein the impeller is arranged in the axial groove.

Making the outer periphery of the dust cover extend axially into an axial groove in the sprocket is advantageous in that the risk of ingress of dirt between the dust cover and the sprocket is hereby reduced. Furthermore, by arranging the impeller in this axial groove, the impeller will not add to the width of the sprocket assembly which is advantageous in that if the sprocket assembly becomes too wide the risk of a bicycle chain wedging, between the sprocket and the cage in which it is mounted, will increase.

In an aspect of the invention, the impeller comprises a number of impeller surfaces being inclined in relation to a sprocket plane being perpendicular in relation to a rotational axis of the sprocket.

Making the impeller comprise impeller surfaces arranged in an angle in relation to a sprocket plane being perpendicular in relation the rotational axis of the sprocket is advantageous in that these angled surfaces hereby will deflect any dirt, mud or other axially away from the sprocket, if dirt, mud or other hits them when they are rotating during use. And the higher the rotation speed is the harder the dirt, mud, water and other will be deflected away from the sprocket during use. Furthermore, the inclined impeller surfaces will generate an air flow away from the sprocket that will reduce the risk of airborne dust, dirt and other finding its way to the inside of the dust cover.

In an aspect of the invention, the impeller surfaces are inclined in a surface angle between 2 and 80 degrees, preferably between 5 and 60 degrees and most preferred between 8 and 45 degrees in relation to the sprocket plane.

If the impeller surfaces are inclined too much in relation to the sprocket plane the risk of dirt building up in the impeller is increased and if the impeller surfaces are inclined too little risk of the impeller surfaces not deflecting the dirt increases. Thus, the present surface angle ranges are particularly advantageous in relation to functionality of the impeller.

In an aspect of the invention, the impeller surfaces are also inclined in a radial direction of the sprocket so that a radial extent of the impeller surfaces increase outwards.

Also inclining the impeller surfaces in a radial direction of the sprocket is advantageous in that the size of the dirt deflecting impeller surfaces hereby decreases the closer the impeller surfaces get to the area where the dust cover and the sprocket meets or almost meets, hereby reducing the risk of the impeller surfaces deflecting dirt into this area. Furthermore, by increasing the radial extent of the impeller surfaces outwards the risk of build-up of dirt in the impeller is reduced.

In an aspect of the invention, a maximum radial extent of the impeller is between 0.5 and 20%, preferably between 1% and 15% and most preferred between 1.5% and 10% of an outer impeller diameter of the impeller.

If the maximum radial extent of the impeller is too big in relation to the outer diameter of the impeller it becomes too difficult to fit the impeller in or on the sprocket and the risk of weakening the sprocket increases. However, if the maximum radial extent of the impeller is too little the dirt deflecting property of the impeller is reduced so much that the effect of the impeller is negligible. Thus, the present ranges regarding the maximum radial extent of the impeller in relation to the outer impeller diameter of the impeller are advantageous in relation to functionality of the impeller and the sprocket.

In an aspect of the invention, the impeller is arranged outside the outer periphery of the dust cover as seen in an axial direction of the sprocket.

Locating the impeller axially outside the area where the dust cover and the sprocket meets or almost meets is advantageous in that this reduces the risk of the impeller deflecting dirt, mud or other towards this area and any dirt, mud or other will be deflected before it reached the critical area.

In an aspect of the invention, the impeller is formed integrally with the sprocket.

Forming the impeller integrally with the sprocket—e.g., by means of indentations or notches formed in the sprocket during moulding or subsequent machining—is advantageous in that this reduced the number of parts in the sprocket assembly, which in turn reduces assembly time and cost.

In an aspect of the invention, the impeller is formed as an independent part connected to the sprocket.

Forming the impeller as an independent part which subsequently is connected to the sprocket is advantageous in that the impeller hereby can be given a more complex design, it can be positioned more advantageously in relation to the area where the dust cover and the sprocket meets or almost meets, and it enables that the impeller can be made in a more suited material.

The invention further relates to a method for preventing ingress of dirt in a bearing of a sprocket assembly. The method comprises the steps of:
 placing the bearing in a center orifice of a sprocket of the sprocket assembly,
 fixating an outer part of the bearing in relation to the sprocket,
 fixating a dust cover of the sprocket assembly in relation to an inner part of the bearing, wherein an outer cover diameter of the dust cover is bigger than an outer bearing diameter of the bearing, so that the dust cover is extending radially past the outer part,
 fixating an impeller of the sprocket assembly in relation to the sprocket at the outer cover diameter of the dust cover, and
 rotating the sprocket and the impeller so that the impeller deflects dirt away from the sprocket.

During use the sprocket rotates and using this rotation to drive the impeller is advantageous in that no further drives for the impeller is needed, and locating the impeller at the outer edge of the dust cover is advantageous in that the impeller hereby will deflect dirt away from the sprocket at the area where the dust cover and the sprocket meets or almost meets and thereby reduce the risk of ingress of dirt in the bearing.

In an aspect of the invention, the method comprises the step of fixating the impeller in relation to the sprocket by forming the impeller integrally with the sprocket.

Forming the impeller integrally with the sprocket is advantageous in that this reduces material use, it reduces assembly cost, and it simplifies the sprocket assembly design.

In an aspect of the invention, the method is performed by means of a sprocket assembly according to any of the previously discussed sprocket assemblies.

Hereby is achieved an advantageous embodiment of the invention.

The invention also relates to use of a sprocket assembly according to any of the previously discussed sprocket assemblies in a pulley wheel system of a derailleur system for a bicycle.

The pulley wheel system of a derailleur system for a bicycle is typically arranged in a position where it is particularly exposed to dirt, mud and other and it is therefore particularly advantageous to use a sprocket assembly according to the present invention in a pulley wheel system of a derailleur system for a bicycle.

For a more complete understanding of the disclosure, reference is now made to the following brief description of various combinable embodiments of the invention.

FIGURES

Figure 2:
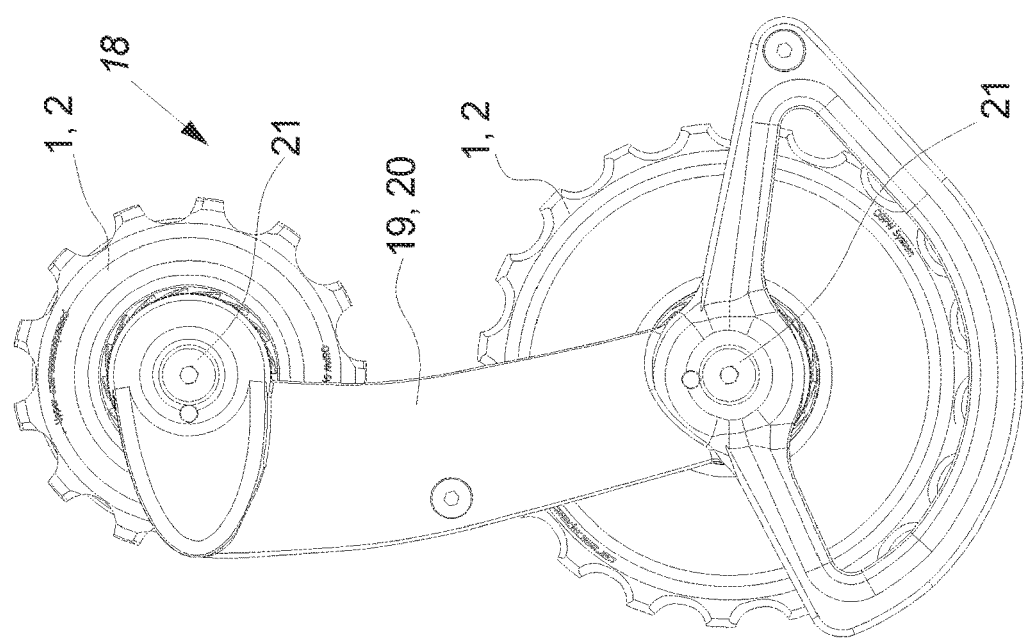
Figure 1:
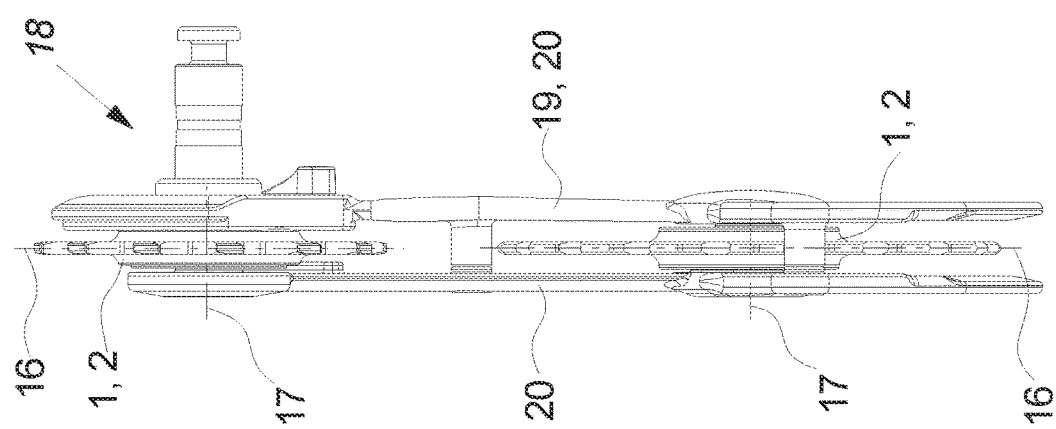
Figure 5:
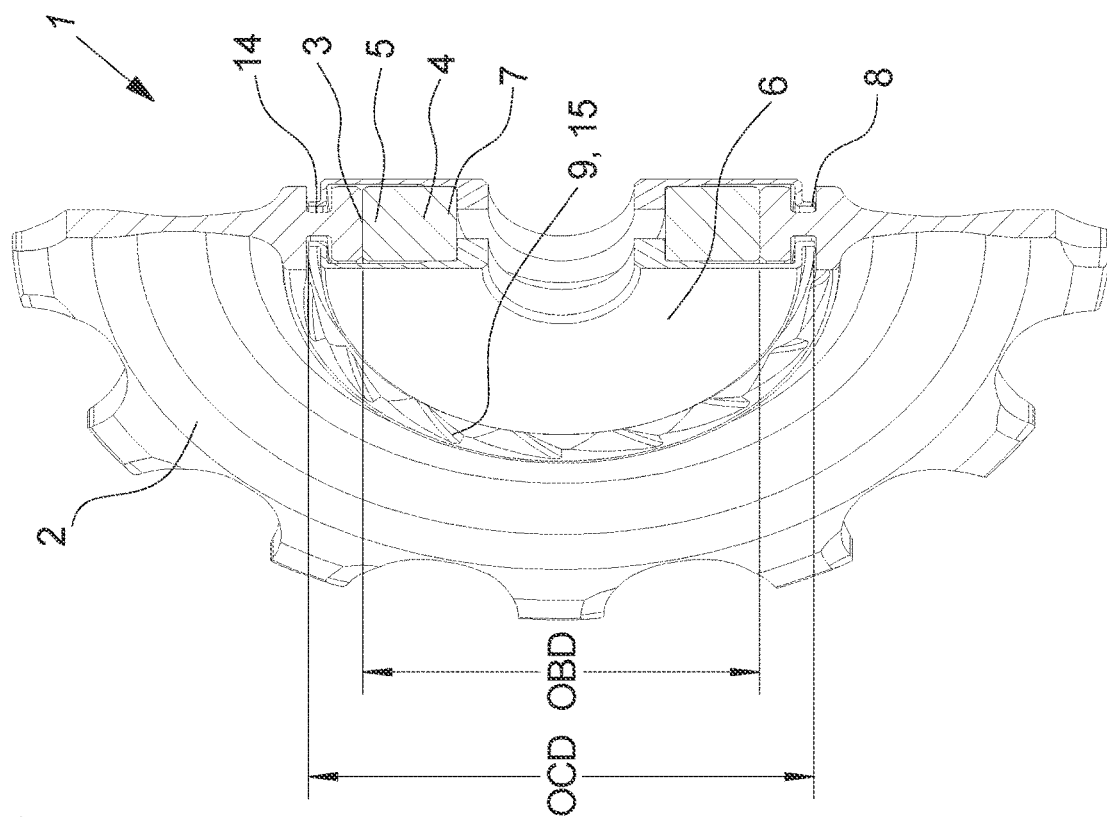
Figure 4:
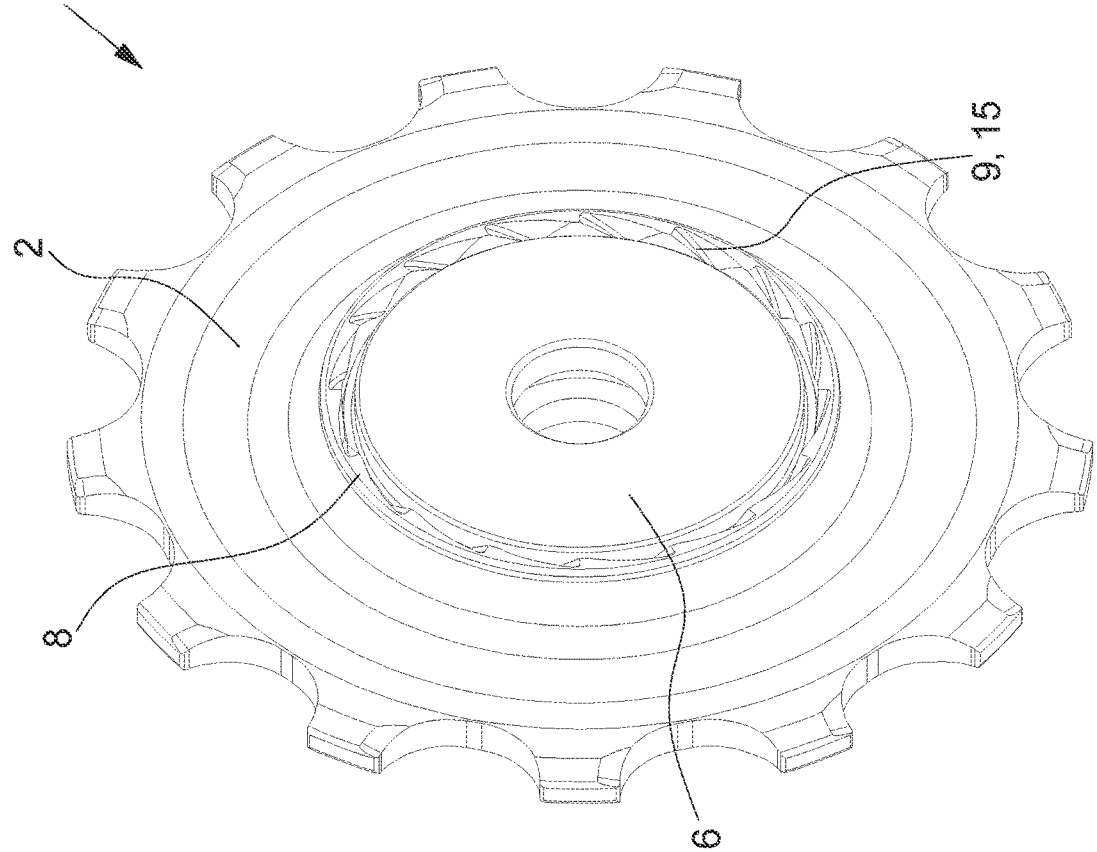
Figure 7:
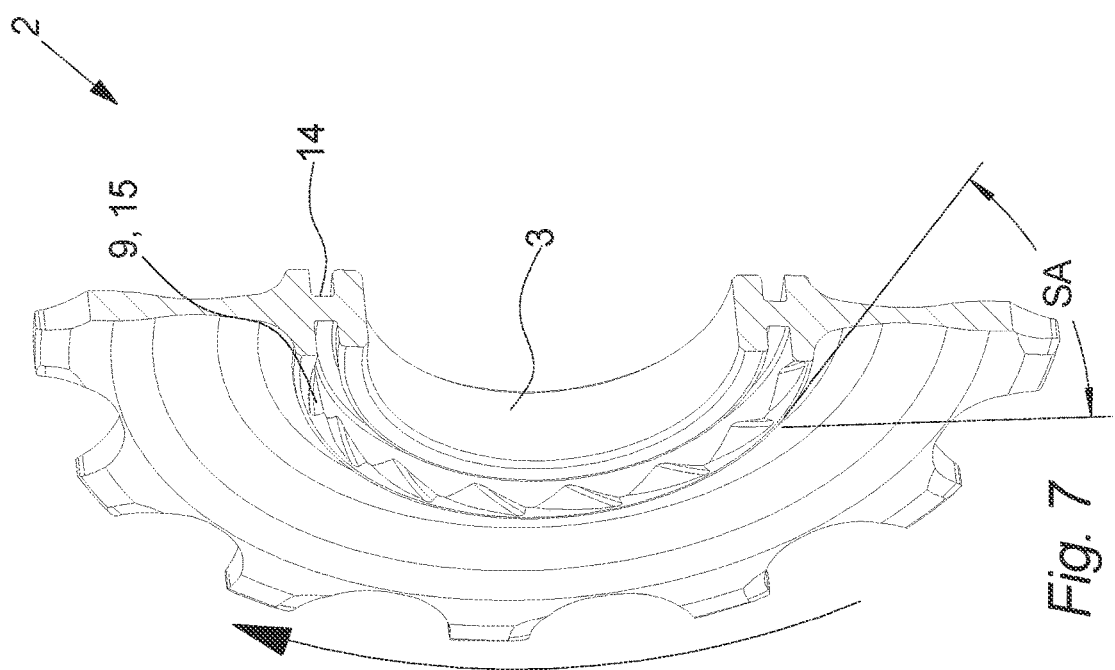
Figure 6:
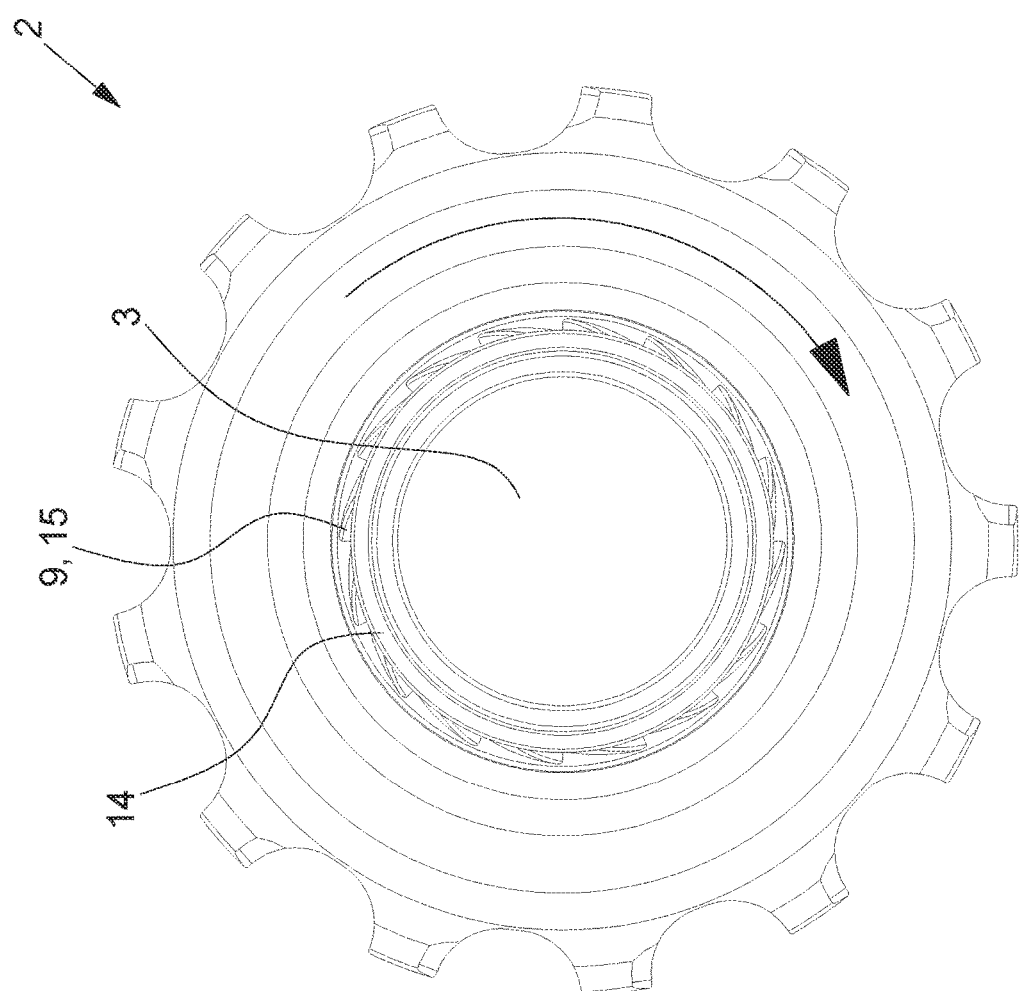
Figure 10:
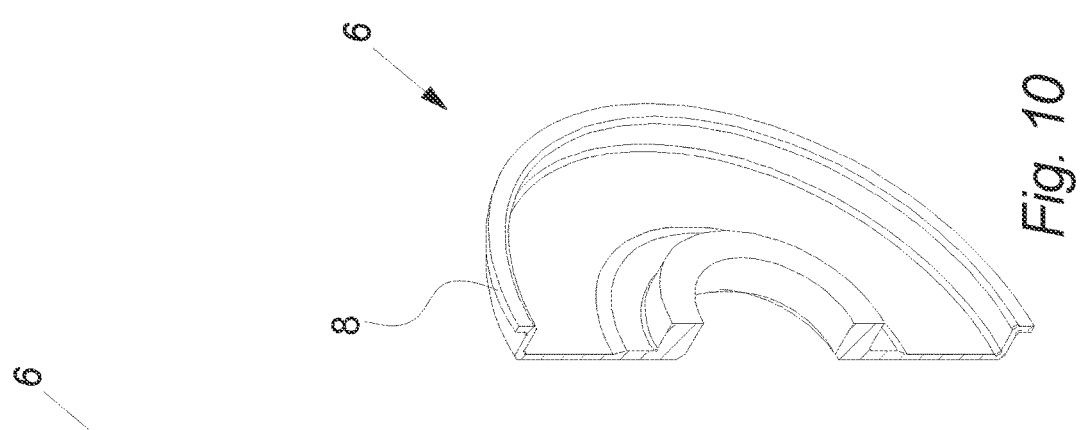
Figure 9:
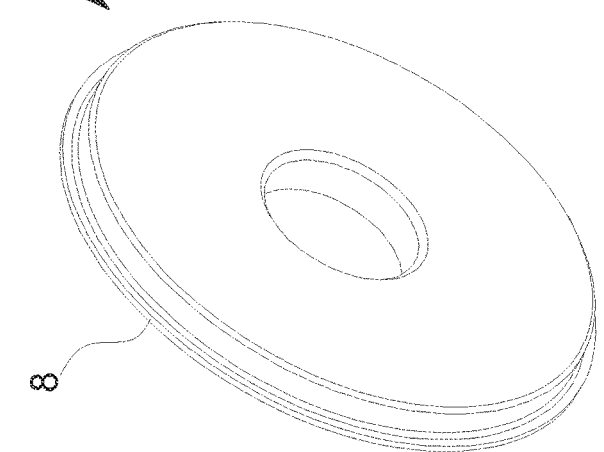
Figure 8:
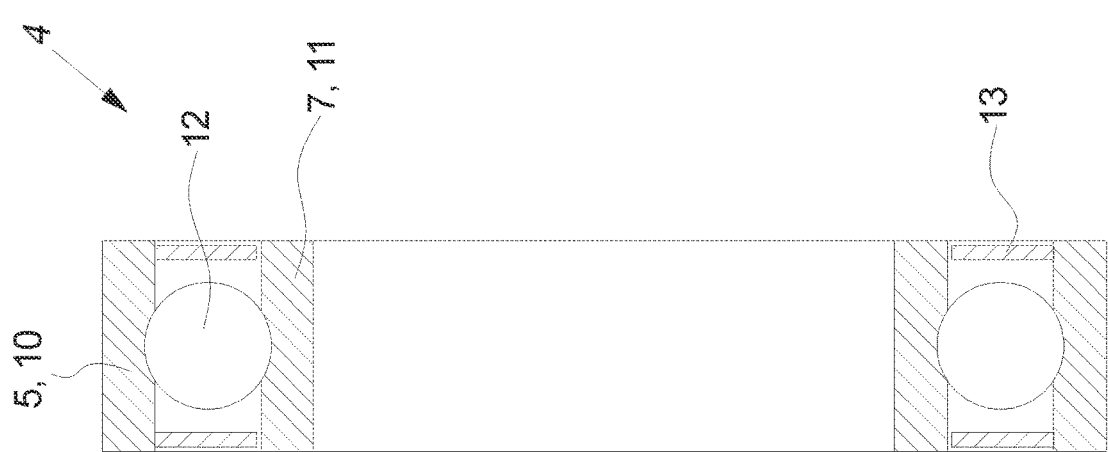

FIG. 1 illustrates a pulley wheel system of a derailleur system, as seen from the front, FIG. 2 illustrates a pulley wheel system of a derailleur system, as seen from the side, FIG. 3 illustrates a pulley wheel system of a derailleur system, as seen in an isometric view, FIG. 4 illustrates a sprocket assembly, as seen in an isometric view, FIG. 5 illustrates a cross section through the middle of a sprocket assembly, as seen in an isometric view, FIG. 6 illustrates a sprocket, as seen from the side, FIG. 7 illustrates a cross section through the middle of a sprocket, as seen in an isometric view, FIG. 8 illustrates a cross section through the middle of a rolling bearing, as seen from the front, FIG. 9 illustrates a dust cover, as seen in an isometric view, and FIG. 10 illustrates a cross section through the middle of a dust cover, as seen in an isometric view.

DETAILED DESCRIPTION

FIG. 1 illustrates a pulley wheel system 18 of a derailleur system for a bicycle, as seen from the front, FIG. 2 illustrates a pulley wheel system 18 of a derailleur system, as seen from the side, and FIG. 3 illustrates a pulley wheel system 18 of a derailleur system, as seen in an isometric view.

A derailleur system is a variable-ratio bicycle gearing system consisting of a chain (not shown), multiple sprockets (not shown) of different sizes fixed in relation to the back wheel (not shown) of the bicycle (not shown), and a mechanism (not shown) to move the chain from one sprocket to another. A modern rear derailleur system typically consists of a moveable chain-guide that is operated remotely by the rider through a lever and a cable. When a rider operates the lever while pedaling, the change in cable tension moves the chain-guide from side to side, "derailing" the chain onto different sprockets. Or the derailleur system could comprise an electrical system comprising a motor operated chain-guide and switch arrangement e.g., communicating wirelessly.

The rear derailleur serves double duty: moving the chain between rear wheel sprockets and taking up chain slack caused by moving to a smaller sprocket at the rear or a smaller chainring by a front derailleur. In order to accomplish this second task, it is positioned in the path of the bottom, slack portion of chain. Although variations exist, most rear derailleur systems have several components in common. They have a pulley wheel system 18 as disclosed in FIGS. 1-3 comprising a cage 19 that holds two sprocket assemblies 1 that guide the chain in an S-shaped pattern. The sprocket assemblies 1 used in the pulley wheel system 18 are also known as the jockey pulley or guide pulley (top) and the tension pulley (bottom). The cage 19 rotates in its plane and is spring-loaded to take up chain slack. The cage 19 is positioned under the desired back wheel sprocket by an arm (not shown) that can swing back and forth under the sprockets. The arm is usually implemented with a parallelogram mechanism to keep the cage 19 properly aligned with the chain as it swings back and forth. The other end of the arm mounts to a pivot point attached to the bicycle frame. The arm pivots about this point to maintain the cage at a nearly constant distance from the different sized rear wheel sprockets.

In this embodiment the cage 19 comprises two side arms 20 connecting the two sprocket shafts 21 on which the sprocket assemblies 1 are mounted to rotate freely. The distance between the side arms 20 corresponds with the width of the chain (not shown) so that the chain cannot break off in the cage and e.g., wedge between the sprocket assemblies 1 and the side arms 20—i.e., typically the distance between the side arms 20 is slightly bigger than the width of the chain. For this reason and others—such as weight, cost, and air resistance—the width of the sprocket assembly 1 is typically also limited to correspond to the width of the chain.

FIG. 4 illustrates a sprocket assembly 1, as seen in an isometric view and FIG. 5 illustrates a cross section through the middle of a sprocket assembly 1, as seen in an isometric view.

In this embodiment the sprocket assembly 1 comprises a sprocket 2 having a centre orifice 3 in which a bearing 4 is located with an outer part 5 of the bearing 4 fixed in relation to the sprocket 2. In this embodiment bearing 4 is a rolling bearing 4 in the form of a ball bearing but in another embodiment the bearing could be another type of rolling bearing 4—such as a roller bearing, a needle bearing or other—or the bearing 4 would be a plain bearing, a journal bearing or other. In this embodiment the outer part 5 of the bearing 4 is fixed in relation to the sprocket 2 through a press fit but in another embodiment the fixation could also or instead be made by through adhesive, shrink fitting, interlocking geometry, screws or other or any combination thereof.

In this embodiment a dust cover 6 is provided on both sides of the bearing 4 to reduce the risk of dust, dirt, mud or other reaching the bearing 4 and potentially causing malfunction of the bearing 4. However, in another embodiment only one side of the bearing 4 would be provided with a dust cover 6 e.g., if the functionality of the dust cover was included in other neighbouring parts on the other side of the bearing 4. In this embodiment the dust covers 6 are fixed in relation to an inner part 7 of the bearing 4, in that the dust covers 6 are arranged to press in the inner part 7 of the bearing 4 when the sprocket assembly 1 is mounted on a sprocket shaft (not shown) and e.g., a nut is tightened against one of the dust covers 6. However, in another embodiment the dust covers 6 could also or instead be fixed in relation to the inner part 7 of the bearing 4 by dedicated holes in the dust covers by means of which screws, bolts or other could force the dust covers 6 against each other and thereby clamp the inner part 7 of the bearing 4, the dust covers 6 could also or instead be connected directly to the inner part 7 of the bearing 4 by means of screws, bolts, rivets, adhesive or other and/or the dust covers 6 or dust cover 6 could be fixed in relation to the inner part 7 of the bearing 4 in numerous other ways.

In this embodiment the outer cover diameter OCD of the dust cover 6 is around 23 mm and the outer bearing diameter OBD of the bearing 4 is around 16 mm so that the outer periphery 8 of the dust cover 6 is extending radially past the outer part 5 of the bearing 4. However, sprocket assemblies 1 can be made in a multitude of varieties depending on the specific use, the specific design and other and in another embodiment outer cover diameter OCD could be bigger—such as 28 mm, 34 mm, 40 mm or even bigger—or it could be smaller—such as 21 mm, 17 mm, 14 mm or even smaller. And likewise, in another embodiment outer bearing diameter OBD could be bigger—such as 20 mm, 25 mm, 30 mm or even bigger—or it could be smaller—such as 14 mm, 12 mm, 10 mm or even smaller—as long at the diameter OCD of the dust cover 6 is bigger than the diameter OBD of the bearing 4 so that the outer periphery 8 of the dust cover 6 is extending radially past the outer part 5 of the bearing.

In this embodiment the outer periphery 8 of the dust cover 6 is extending radially past the outer part 5 of the bearing 4 and further axially into an axial groove 14 in the sprocket 2, so that the "free" end of the dust cover 6 is tucked away inside the axial groove 14 in the sprocket 2 to reduce the risk of dirt, mud and other finding its way to the bearing 4 through a potential small gap between the outer periphery 8 of the dust cover 6 and the sprocket 2. However, in another embodiment the outer periphery 8 of the dust cover 6 could be arranged just inside an annular protrusion on the sprocket 2, along a flat surface on the sprocket 2 or at another location.

In this embodiment the sprocket assembly 1 is further provided with an impeller 9 arranged at the outer periphery 8 of the dust cover 6 and fixed in relation to the sprocket 2. In this embodiment the impeller 9 is machined into the sprocket 1 so that the impeller 9 is formed integrally with the sprocket 2. However, in another embodiment the impeller 9 could be an independent part which was connected to the sprocket 2 by means of connectors—such as screws, bolt, rivets, adhesive, shrink fitting, welding or other.

In this embodiment the impeller 9 is arranged in the axial groove 14 but in another embodiment the impeller 9 could be placed on an outside surface of the sprocket 2, on a protrusion of the sprocket 2 or elsewhere on the sprocket 2 as long as the impeller 9 is arranged at the outer periphery 8 of the dust cover 6.

In this embodiment all of the impeller 9 is arranged axially outside the outer periphery 8 of the dust cover 6 to deflect dirt, dust and other before it reaches the outer periphery 8 of the dust cover 6. However, in another embodiment at least some of the impeller 9 could axially overlap the outer periphery 8 of the dust cover 6 or the impeller 9 could be placed axially inside the outer periphery 8 of the dust cover 6.

In this embodiment the sprocket assembly 1 is used for preventing ingress of dirt in the bearing 4 by means of the following method. First the bearing 4 is placed in the centre orifice 3 of the sprocket 2 and fixed in relation to the outer part 5 of the bearing 4 by means of one or more of the previously discussed methods for fixating these parts in relation to each other. A dust cover 6 is then fixed coaxially in relation to an inner part 7 of the bearing 4 so that the dust cover 6 is extending radially past the outer part 5 of the bearing 4—because the diameter OCD of the dust cover 6 is bigger than the diameter OBD of the bearing 4. An impeller 9 is fixated in relation to the sprocket 2 at the outer cover diameter OCD of the dust cover 6 and during normal use the sprocket 2 and the impeller 9 is rotated so that the impeller 9 deflects dirt, mud, dust, water and other away from the sprocket 2 and thereby away from the gap between the outer periphery 8 of the dust cover 6 and the sprocket 2. However, it should be noted that several of these method steps can be performed in a different order or simultaneously. E.g., if the impeller 9 is formed integrally with the sprocket 2—as shown in the figures—the impeller 9 would obviously be formed in the sprocket—during casting or/or subsequent machining—before the bearing 4 is fixed to the sprocket 2 and before the dust cover(s) 6 is mounted.

The impellers 9 efficiency regarding deflection of dirt, mud and other during use is at least to some degree dependent on the rotational direction of the sprocket assembly and in another embodiment the method comprises the step of orientation the impeller 9 to correspond to the intended rotational direction of the sprocket 2 and/or rotate the sprocket 2 and the impeller 9 so that the impeller surfaces 15 of the impeller 9 are angled so that the distance from the impeller surfaces 15 to a sprocket plane 16 (see FIG. 1) being perpendicular in relation to a rotational axis 17 (see FIG. 1) of the sprocket 2 decreases in the rotational direction of the sprocket 2 so that the impeller 9 better deflects dirt, mud, dust, water and other away from the sprocket 2.

FIG. 6 illustrates a sprocket 2, as seen from the side, and FIG. 7 illustrates a cross section through the middle of a sprocket 2, as seen in an isometric view.

In this embodiment the impeller 9 comprises sixteen impeller surfaces 15 evenly distributed over 360 degrees. However, in another embodiment the impeller 9 could comprise more impeller surfaces 15—such as 20, 30, 40 or even more—or the impeller 9 could comprise less impeller surfaces 15—such as 13, 10, 8 or even less—e.g., depending on the specific use of the sprocket assembly 1, the specific design of the sprocket assembly 1, the size of the sprocket assembly 1 or other.

In this embodiment the impeller surfaces 15 are inclined in relation to the sprocket plane 16 (see FIG. 1) so that the impeller surfaces 15 deflect dirt, mud, dust, water and other away from the sprocket 2 when the impeller 9 is rotated and in this embodiment the impeller surfaces 15 are inclined in a surface angle SA of around 30 degrees in relation to the sprocket plane 16. However, in another embodiment the surface angle SA of the impeller surfaces 15 could be bigger—such as 35 degrees, 42 degrees, 48 degrees or even bigger—or the surface angle SA of the impeller surfaces 15 could be smaller—such as 27 degrees, 24 degrees, 16 degrees or even smaller—e.g., dependent on the specific use of the sprocket assembly 1, the specific design of the sprocket assembly 1, the size of the sprocket assembly 1 or other.

When the impeller 9 is used in a sprocket assembly 1 in a pulley wheel system 18 of a derailleur system for a bicycle, the impeller 9 will always (or almost always) rotate in one direction in that one cannot reverse a bicycle with this gear type. Therefore, the impeller 9 in this embodiment only comprises impeller surfaces 15 inclined in a direction corresponding to the intended rotational direction of the sprocket 2—as indicated by the arrows on FIGS. 6 and 7. However, in another embodiment the impeller 9 could comprise impeller surfaces 15 that were inclined in both rotational directions to be able to deflect dirt, mud and other no matter the rotational direction and or the sprocket assembly 1 could comprise more than one impeller 9 having opposite or different inclination directions and/or angles.

In this embodiment the impeller surfaces 15 are also inclined in a radial direction of the sprocket 2 so that a radial extent of the impeller surfaces 15 increase outwards but in another embodiment the radial extent of the impeller surfaces 15 could be constant, it could vary throughout the radial extent or the radial extent of the impeller surfaces 15 could even decrease outwards—e.g., dependent on the specific use of the sprocket assembly 1, the specific design of the sprocket assembly 1, the specific location and/or nature of the impeller 9 or other.

In this embodiment the maximum radial extent of the impeller 9 is around 1 mm and the outer impeller diameter of the impeller 9 is around 26 mm. Thus, in this embodiment the maximum radial extent of the impeller 9 is around 4% of the outer impeller diameter of the impeller 9. However, in another embodiment the maximum radial extent of the impeller 9 could be bigger—such as 7%, 12%, 17% or even more of the outer impeller diameter of the impeller 9—or the maximum radial extent of the impeller 9 could be smaller—such as 3%, 2.5%, 1.8% or even less of the outer impeller diameter of the impeller 9—e.g., dependent on the specific use of the sprocket assembly 1, the specific design of the sprocket assembly 1, the specific location and/or nature of the impeller 9 or other.

FIG. 8 illustrates a cross section through the middle of a rolling bearing 4, as seen from the front.

In the embodiments disclosed in FIGS. 1-7 the bearing 4 in the sprocket assembly 1 is a rolling bearing 4 in the form of a ball bearing comprising an outer part 5 in the form of an outer ring 10 and an inner part 7 in the form of an inner ring 11, wherein rolling elements 12 in the form of balls are located to rotate between the inner ring 11 and the outer ring 10. In this embodiment the rolling bearing 4 further comprises a non-contact seal 13 arranged between the inner ring 11 and the outer ring 10 to aid in reducing the risk of dirt and other reaching the rolling elements inside the bearing 4. In this embodiment the non-contact seal 13 is fixed in relation to the outer ring 10 and a small gap is formed between the seal 13 and the inner ring 11 to ensure that the seal 4 does not increase friction in the bearing 4. However, in another embodiment the bearing 4 could comprise another type of seal—such as a light contact seal having a reduced friction in relation to fully sealed bearings.

FIG. 9 illustrates a dust cover 6, as seen in an isometric view, and FIG. 10 illustrates a cross section through the middle of a dust cover 6, as seen in an isometric view.

In this embodiment the dust cover 6 is formed as a disc arranged to be clamped around the bearing 4 during mounting of the sprocket assembly 1 but as previously discussed in another embodiment the dust cover 6 could further comprise means for being fixed to the bearing 4.

Illustrations: A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A sprocket assembly (1) comprising, a sprocket (2) including a centre orifice (3), a bearing (4) located in said centre orifice (3) with an outer part (5) of said bearing (4) fixed in relation to said sprocket (2), a dust cover (6) fixed in relation to an inner part (7) of said bearing (4), wherein an outer cover diameter (OCD) of said dust cover (6) is bigger than an outer bearing diameter (OBD) of said bearing (4), so that an outer periphery (8) of said dust cover (6) is extending radially past said outer part (5), and an impeller (9) arranged at said outer periphery (8) of said dust cover (6), wherein said impeller (9) is fixed in relation to said sprocket (2).

Illustration 2. A sprocket assembly (1) according to Illustration 1, wherein said bearing (4) is a rolling bearing (4), wherein said outer part (5) is an outer ring (10) of said rolling bearing (4) and said inner part (7) is an inner ring (11) of said rolling bearing (4), and wherein rolling elements (12) are located between said inner ring (11) and said outer ring (10).

Illustration 3. A sprocket assembly (1) according to Illustration 2, wherein said rolling bearing (4) comprises a non-contact seal (13) between said inner ring (11) and said outer ring (10).

Illustration 4. A sprocket assembly (1) according to any of the preceding Illustrations, wherein said outer periphery (8) of said dust cover (6) is extending radially past said outer part (5) and further axially into an axial groove (14) in said sprocket (2), and wherein said impeller (9) is arranged in said axial groove (14).

Illustration 5. A sprocket assembly (1) according to any of the preceding Illustrations, wherein said impeller (9) comprises a number of impeller surfaces (15) being inclined in relation to a sprocket plane (16) being perpendicular in relation to a rotational axis (17) of said sprocket (2).

Illustration 6. A sprocket assembly (1) according to Illustration 5, wherein said impeller surfaces (15) are inclined in a surface angle (SA) between 2 and 80 degrees, preferably between 5 and 60 degrees and most preferred between 8 and 45 degrees in relation to said sprocket plane (16).

Illustration 7. A sprocket assembly (1) according to Illustration 5 or 6, wherein said impeller surfaces (15) are also inclined in a radial direction of said sprocket (2) so that a radial extent of said impeller surfaces (15) increase outwards.

Illustration 8. A sprocket assembly (1) according to any of the preceding Illustrations, wherein a maximum radial extent of said impeller (9) is between 0.5 and 20%, preferably between 1% and 15% and most preferred between 1.5% and 10% of an outer impeller diameter of said impeller (9).

Illustration 9. A sprocket assembly (1) according to any of the preceding Illustrations, wherein said impeller (9) is arranged outside said outer periphery (8) of said dust cover (6) as seen in an axial direction of said sprocket (2).

Illustration 10. A sprocket assembly (1) according to any of the preceding Illustrations, wherein said impeller (9) is formed integrally with said sprocket (2).

Illustration 11. A sprocket assembly (1) according to any of Illustrations 1-9, wherein said impeller (9) is formed as an independent part connected to said sprocket (2).

Illustration 12. A method for preventing ingress of dirt in a bearing (4) of a sprocket assembly (1), said method comprises the steps of:
  placing said bearing (4) in a centre orifice (3) of a sprocket (2) of said sprocket assembly (1),
  fixating an outer part (5) of said bearing (4) in relation to said sprocket (2),
  fixating a dust cover (6) of said sprocket assembly (1) in relation to an inner part (7) of said bearing (4), wherein an outer cover diameter (OCD) of said dust cover (6) is bigger than an outer bearing diameter (OBD) of said bearing (4), so that said dust cover (6) is extending radially past said outer part (5),
  fixating an impeller (9) of said sprocket assembly (1) in relation to said sprocket (2) at said outer cover diameter (OCD) of said dust cover (6), and
  rotating said sprocket (2) and said impeller (9) so that said impeller (9) deflects dirt away from said sprocket (2).

Illustration 13. A method according to Illustration 12, wherein said method comprises the step of fixating said impeller (9) in relation to said sprocket (2) by forming said impeller (9) integrally with said sprocket (2).

Illustration 14. A method according to Illustration 12 or 13, wherein said method is performed by way of a sprocket assembly (1) according to any of illustrations 1-11.

Illustration 15. Use of a sprocket assembly (1) according to any of Illustrations 1-11 in a pulley wheel system (18) of a derailleur system for a bicycle.

The invention has been exemplified above with reference to specific examples of sprockets 2, bearings 4, impellers 9 and other. However, it should be understood that the invention is not limited to the particular examples described above but may be designed and altered in a multitude of varieties within the scope of the invention as specified in the claims.

LIST

1. Sprocket assembly
2. Sprocket
3. Centre orifice of sprocket
4. Bearing
5. Outer part of bearing
6. Dust cover
7. Inner part of bearing
8. Outer periphery of dust cover
9. Impeller
10. Outer ring of rolling bearing 11. Inner ring of rolling bearing
12. Rolling element
13. Non-contact seal
14. Axial groove in sprocket
15. Impeller surface
16. Sprocket plane
17. Rotational axis of sprocket
18. Pulley wheel system
19. Cage
20. Side arm
21. Sprocket shaft
OCD. Outer cover diameter
OBD. Outer bearing diameter
SA. Surface angle

The invention claimed is:

1. A sprocket assembly comprising,
   a sprocket including a center orifice,
   a bearing located in said center orifice with an outer part of said bearing fixed in relation to said sprocket,
   a dust cover fixed in relation to an inner part of said bearing, wherein an outer cover diameter of said dust cover is bigger than an outer bearing diameter of said bearing, so that an outer periphery of said dust cover is extending radially past said outer part, and
   an impeller arranged at said outer periphery of said dust cover, wherein said impeller is fixed in relation to said sprocket.

2. The sprocket assembly according to claim 1, wherein said bearing is a rolling bearing, wherein said outer part is an outer ring of said rolling bearing and said inner part is an inner ring of said rolling bearing, and wherein rolling elements are located between said inner ring and said outer ring.

3. The sprocket assembly according to claim 2, wherein said rolling bearing comprises a non-contact seal between said inner ring and said outer ring.

4. The sprocket assembly according to claim 1, wherein said outer periphery of said dust cover is extending radially past said outer part and further axially into an axial groove in said sprocket, and wherein said impeller is arranged in said axial groove.

5. The sprocket assembly according to claim 1, wherein said impeller comprises a number of impeller surfaces being inclined in relation to a sprocket plane being perpendicular in relation to a rotational axis of said sprocket.

6. The sprocket assembly according to claim 5, wherein said impeller surfaces are inclined in a surface angle between 2 and 80 degrees in relation to said sprocket plane.

7. The sprocket assembly according to claim 5, wherein said impeller surfaces are also inclined in a radial direction of said sprocket so that a radial extent of said impeller surfaces increase outwards.

8. The sprocket assembly according to claim 1, wherein a maximum radial extent of said impeller is between 0.5 and 20% of an outer impeller diameter of said impeller.

9. The sprocket assembly according to claim 1, wherein said impeller is arranged outside said outer periphery of said dust cover as seen in an axial direction of said sprocket.

10. The sprocket assembly according to claim 1, wherein said impeller is formed integrally with said sprocket.

11. The sprocket assembly according to claim 1, wherein said impeller is formed as an independent part connected to said sprocket.

12. A method for preventing ingress of dirt in a bearing of a sprocket assembly, said method comprises steps of:
   placing said bearing in a center orifice of a sprocket of said sprocket assembly,
   fixating an outer part of said bearing in relation to said sprocket,
   fixating a dust cover of said sprocket assembly in relation to an inner part of said bearing, wherein an outer cover diameter of said dust cover is bigger than an outer bearing diameter of said bearing, so that said dust cover is extending radially past said outer part,
   fixating an impeller of said sprocket assembly in relation to said sprocket at said outer cover diameter of said dust cover, and
   rotating said sprocket and said impeller, so that said impeller deflects dirt away from said sprocket.

13. The method according to claim 12, wherein said method further comprises a step of fixating said impeller in relation to said sprocket by forming said impeller integrally with said sprocket.

14. The method according to claim 12, wherein further comprising a step of providing the sprocket assembly.

15. A pulley wheel system of a derailleur system for a bicycle, the pulley wheel system comprising:
   a sprocket assembly including:
      a sprocket including a center orifice,
      a bearing located in the center orifice with an outer part of the bearing fixed in relation to the sprocket,
      a dust cover fixed in relation to an inner part of the bearing, an outer cover diameter of the dust cover being bigger than an outer bearing diameter of the bearing such that an outer periphery of the dust cover extends radially past the outer part of the bearing, and
      an impeller arranged at the outer periphery of the dust cover, the impeller being fixed in relation to the sprocket.

* * * * *